H. SMITH.
HAY LOADING DEVICE.
APPLICATION FILED APR. 2, 1915.
1,353,975.
Patented Sept. 28, 1920.
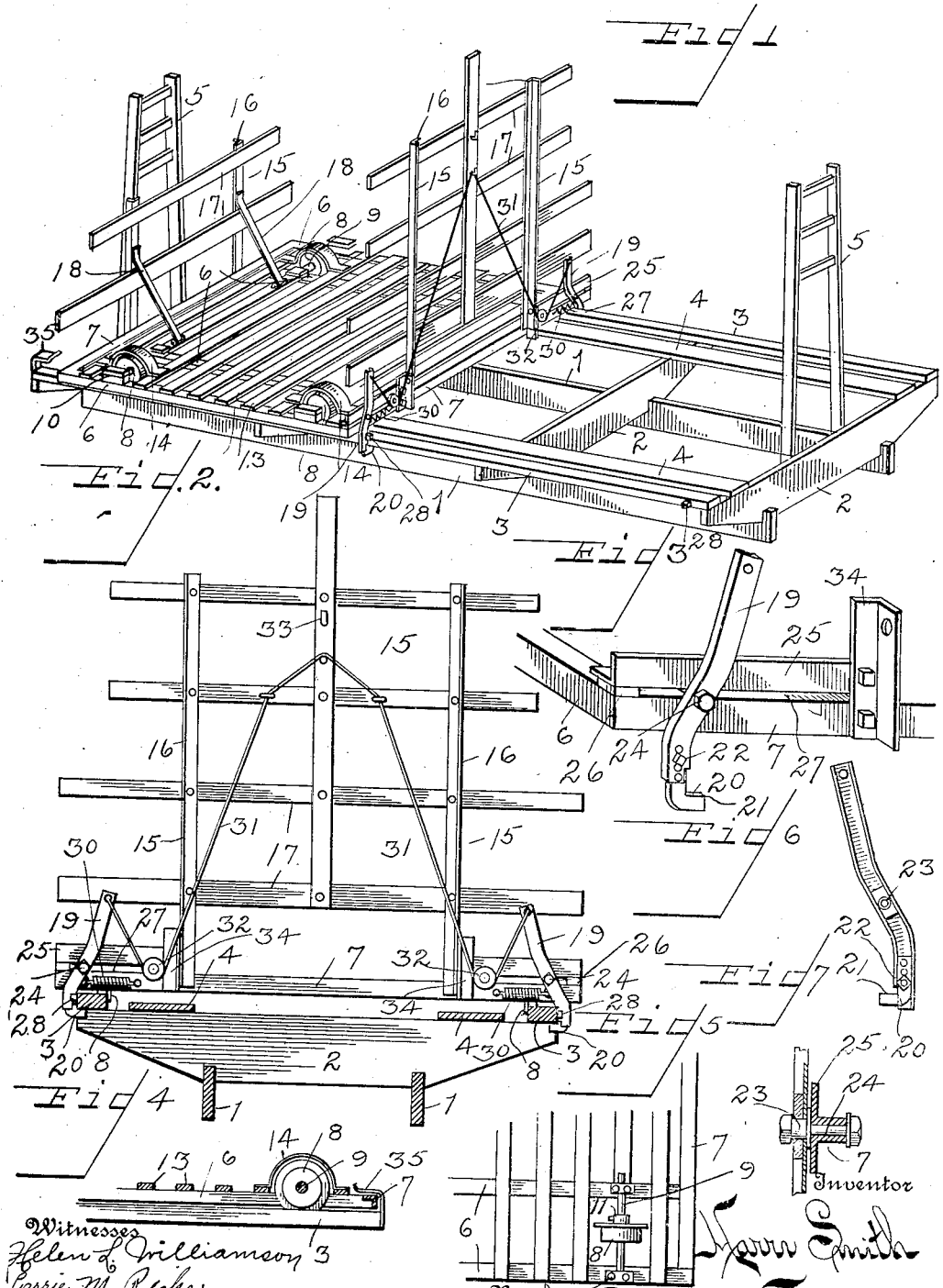

UNITED STATES PATENT OFFICE.

HARRY SMITH, OF DAYTON, OHIO.

HAY-LOADING DEVICE.

1,353,975.  Specification of Letters Patent.  Patented Sept. 28, 1920.

Application filed April 2, 1915. Serial No. 18,721.

*To all whom it may concern:*

Be it known that I, HARRY SMITH, citizen of the United States, residing at Dayton, in the county of Montgomery and State of Ohio, have invented certain new and useful Improvements in Hay-Loading Devices, of which the following is a specification.

My invention relates to farm vehicles and particularly to a vehicle bed for hauling hay, fodder, or other similar bulky produce. The invention relates especially to that type of vehicle bed which embodies a main bed portion and a movable truck of substantially half the length of the bed portion mounted thereon for to and fro movement and adapted to be shifted to the rear end of the vehicle bed and there loaded to its full capacity, after which it is advanced to the forward end of the vehicle bed and the rear portion of the bed is then similarly loaded.

It is recognized that vehicle beds embodying longitudinally movable trucks capable of the to and fro movement, as described, are not new in the art. However, such devices, as heretofore constructed, have not been commercially successful and have not gone into general use, mainly due to the fact that they have not been so constructed as to be interchangeable or universal in their application to vehicle beds already in used, but to the contrary, have been of such special design as to require a main bed portion especially constructed to conform to the truck or it has been necessary to build a special truck to conform with a bed portion already in use.

Recognizing these difficulties and disadvantages, one of the primary objects of the present invention is to embody in such a structure features of adjustability which shall render the trucks interchangeable or universal in their application to vehicle beds already in use. To accommodate the trucks to different beds it is necessary to provide for the lateral adjustment of the carrying wheels whereby the wheels may be accommodated to differently spaced guide ways or rails upon the vehicle bed and also to provide for the lateral adjustment of the locking means by which the truck is secured in different positions of adjustment in relation with the vehicle bed.

Furthermore, inasmuch as the structural bars of the vehicle bed may differ very materially in thickness, it is further necessary to provide for the vertical adjustment of the locking means in relation with the truck in order that it may be accommodated to vehicle beds of different heights or embodying rails or bars of different thicknesses.

Inasmuch as such structures are subjected to very severe strains and to hard usage generally, it has heretofore been the custom to build these trucks of comparatively heavy timbers in order to afford strength and in so doing the resulting structures were of great rigidity. It has been found in practice that while strength is necessary, rigidity of the structure is undesirable. Vehicles of this kind are used on rough and uneven ground and are subjected to very severe twisting strains. This is particularly true when one wheel of the vehicle passes over an elevated obstruction or drops into a hole while the remaining wheels of the vehicle rest upon a comparatively level surface. It has been found that when the trucks are rigidly constructed, as has heretofore been the custom, such warping or twisting of the main vehicle bed has caused the wheels of the truck to leave their track or guide and has served to wrench or weaken the truck and in some cases has caused fracture of the parts.

To overcome this difficulty is one of the primary objects of the present invention, and to this end the frame of the truck is made yielding or flexible whereby it is capable of a warping movement to accommodate itself to a warping or twisting of the vehicle bed due to uneven ground or obstructions. It has been further found that the jolting of the vehicle when empty tends to disconnect the truck from its guides or rails upon the vehicle bed. To provide means for maintaining the truck in proper relation with the vehicle bed is a further object of the invention.

With the above primary and other incidental objects in view, as will more fully appear in the specification, the invention consists of the features of construction, the parts and combinations thereof, and the mode of operation or their equivalents, as hereinafter described and set forth in the claims.

Referring to the drawings, Figure 1 is a perspective view of the structure forming the subject matter hereof. Fig. 2 is a front elevation thereof. Fig. 3 is a detail view of one of the adjustable locking elements. Figs. 4 and 5 are detail views of the truck construction. Figs. 6 and 7 are detail views of the locking lever.

Like parts are indicated by similar characters of reference throughout the several views.

In applying the invention, there is employed the usual hay rack or bed comprising the usual longitudinal stringers 1 upon which are carried the transverse ties 2 supporting at their outer extremities longitudinally disposed parallel bars or rails 3 which form a track or longitudinal guide for the movable truck. Secured to the transverse ties 2 intermediate the track bars 3 and parallel therewith, there are usually provided longitudinal planks 4 to provide ample support for that portion of the load which is carried directly upon the rack or bed. At the forward and rearward ends of the rack are provided standards 5. This is the usual construction of a hay rack as commonly employed for many years past.

Mounted to reciprocate upon the main bed or rack is a movable truck substantially equal in length to one half that of the rack or bed. This truck embodies a frame comprising a plurality of angle bars connected one to the other of such proportion that, while affording the necessary strength to resist breaking, they are, at the same time, capable of a limited yielding movement or flexibility which will permit the truck to yield or warp to correspond with the twisting movement of the bed. The longitudinal angle bars 6 are preferably arranged in pairs spaced apart on opposite sides of the trucks and these bars 6 are connected at their ends by transverse bars 7.

The truck is supported upon flanged carrying wheels 8, one of which is located adjacent to each corner of the truck frame. These carrying wheels 8 are each independently mounted in the truck frame, and in order that the flexibility or warping of the truck may not be affected by the transverse shaft, each of the wheels is provided with a separate or independent short shaft 9 mounted in suitable bearings upon the longitudinal frame bars 6. These frame bars 6 are spaced one from the other a sufficient distance to permit the flanged wheels 8 a range of laterally adjustable movement upon their respective shafts sufficient to accommodate the truck to variations in the spacing of the bearing rails or track bars of different vehicle beds. This is preferably accomplished by mounting the flanged carrying wheels 8 loosely upon the shaft 9 whereby they are capable of both sliding or lateral movement and revoluble movement thereon. The shafts are secured in any suitable manner in the frame bar 6. In the drawings, bearing blocks 10 have been shown in which the ends of the shaft 9 are engaged.

Adjustable collars 11 are preferably provided upon the shaft 9 at one side of the flanged wheel to prevent the disengagement of the wheels from the bearing rails or bars in one direction. Variations of the wheels in the opposite direction will be prevented by the engagement of the flanges thereof with the bearing rails or track bars. This construction permits the carrying wheels to be adjusted to and from each other independently to accommodate the truck to beds of different widths, and furthermore, the wheels being independently mounted upon separate shafts, the flexing or warping of the truck frame is permitted inasmuch as the carrying wheels are capable of vertical adjustment independent one of the other in unison with such warping movement.

The truck frame thus described is preferably provided with a flat bottom 13 constructed of wood slats. Guards 14 are provided over each of the carrying wheels 8. At each end of the truck uprights or standards are provided as indicated at 15. These uprights or standards each comprise two upright angle bars 16 pivotally connected to suitable brackets upon the truck frame. Transverse slats or bars 17 are attached to these uprights 16 to form the standards which are foldable downward onto the bottom of the truck. Brace arms 18 hinged to the bottom of the truck serve to hold the standards in upright positions.

Mounted at the forward end of the truck frame are locking elements for interengaging the truck with the bed or rack. These locking elements each comprise an oscillatory locking lever 19 preferably, though not necessarily, constructed of a length of channel bar, as indicated in the drawings. At the lower end of each locking lever there is provided an adjustable locking finger 20, having an offset or shoulder 21 at its extremity. The locking finger 20 is longitudinally adjustable in relation with the lever 19 and is secured in its adjusted position by means of the bolt 22. By this means the locking lever is accommodated to vehicle beds or racks having bearing rails or guide bars 3 of different thicknesses. It is obvious that in event a bed is encountered having bearing rails or guide bars two inches in thickness, the locking fingers 20 must be extended a greater distance than for the bed or rack having guides or bearing bars one inch in thickness.

The locking lever 19 is provided with a bushing 23 through which extends a stud 24 capable of lateral adjustment to different positions upon the truck. The forward transverse frame bar 7 of the truck may be provided with a longitudinal slot for the reception of the stud 24. However, in actual practice it has been found desirable to bolt to the upper face of the forward angle bar 7 a short length of angle bar 25 in a reversed 2. The combination with a vehicle bed or rack having longitudinal track bars thereon of a longitudinally movable truck of less length than the vehicle rack or bed comprising a plurality of longitudinally disposed and transversely arranged members so proportioned and connected as to form a flexible structure capable of a warping movement to substantially conform with the movements of the rack or bed as the vehicle travels over uneven ground, a plurality of carrying wheels and an independent trunnion shaft for each wheel whereby the wheels may independently respond to vertical or warping movement of the truck or rack.

3. The combination with a vehicle bed or rack having longitudinal track bars thereon of a longitudinally movable truck of less length than the vehicle rack or bed comprising a plurality of longitudinally disposed and transversely arranged members so proportioned and connected as to form a flexible structure capable of a warping movement to substantially conform with the movements of the rack or bed as the vehicle travels over uneven ground, a plurality of independent trunnion shafts mounted in said truck one for each carrier wheel, a single carrier wheel on each trunnion shaft, said wheels being independently adjustable upon their respective shafts and means for positively engaging the wheels in adjusted positions, the construction and arrangement being such that the wheels may independently respond to warping movement of the truck or rack.

4. The combination with a vehicle bed or rack having longitudinal track bars thereon of a longitudinally movable truck movable to and fro upon the vehicle bed or rack, a pivoted locking lever for the truck, and an adjustable fulcrum support for the locking lever movable to and fro in a direction transverse to the direction of movement of the truck whereby said locking lever may be accommodated to differently positioned track bars, and means for retaining the fulcrum member in different positions of adjustment.

5. The combination with a vehicle bed or rack having longitudinal track bars thereon of a longitudinally movable truck movable to and fro upon the vehicle bed or rack, a pivoted locking lever for the truck, an engaging finger adjustably carried by the lever and means for fixedly engaging the finger with the locking lever in different positions of adjustment.

6. The combination with a vehicle bed of a reciprocatory truck comprising a plurality of angle bars connected one to the other to form a substantially rectangular frame, a plurality of carrying wheels therefor, a shaft for each carrying wheel upon which the wheel is capable of lateral adjustment independent of the other wheels, and laterally adjustable locking means for interengaging the truck with the bed.

In testimony whereof I have hereunto set my hand this 25th day of March A. D. 1915.

HARRY SMITH

Witnesses:
· ROBERT E. COWDEN,
CARRIE M. RECKER.